C. A. McEvoy,
Car Seat Lock.

No. 28,190.

Patented May 8, 1860.

Witnesses

Inventor:
C. A. McEvoy
by Munn & Co
Attorneys

UNITED STATES PATENT OFFICE.

C. A. McEVOY, OF RICHMOND VIRGINIA.

BOLT FOR CAR-SEATS.

Specification of Letters Patent No. 28,190, dated May 8, 1860.

*To all whom it may concern:*

Be it known that I, C. A. McEvoy, of Richmond, in the county of Henrico and State of Virginia, have invented a new and useful Improvement in Portable Bolts for the Backs of Car-Seats; and I do hereby declare that the following is a full, clear, and exact description of the same, reference being had to the accompanying drawings, forming a part of this specification, in which—

Figure 1:
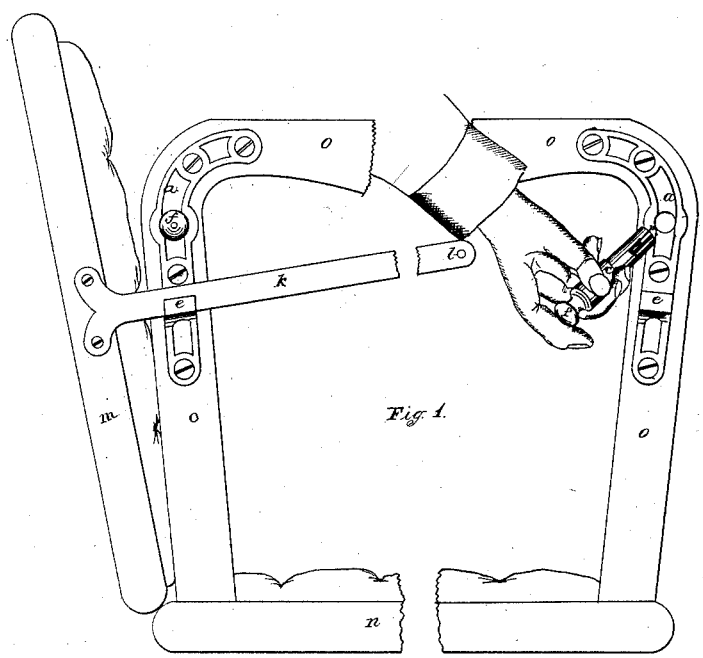
Figure 2:
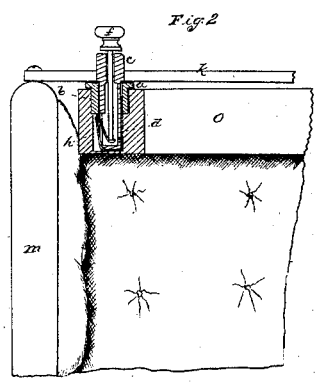
Figure 3:
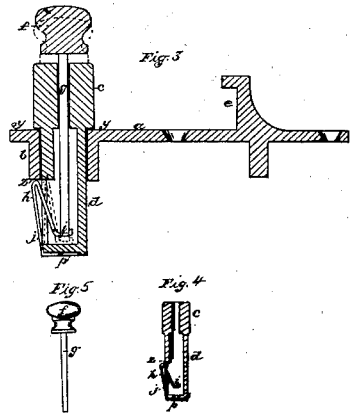
Figures 4, 5:
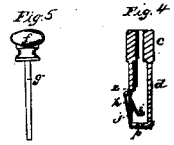

Figure 1, is a side view of a car seat with the shoulder plates and my improved self locking bolt attached. Fig. 2, is a top view and partial horizontal section of a portion of a car seat. Fig. 3, is a section through the bolt and shoulder-plate. Fig. 4, is a section through the bolt detached. Fig. 5, a side view of the pin used for unfastening my bolt.

Similar letters of reference, in each of the several figures indicate corresponding parts.

My invention consists in a portable self fastening bolt in combination with a detachable pin, for use in connection with car seats, or other objects to which it may be applicable.

The advantage of using a bolt of this description is, that a single bolt to each car seat will answer for locking the back of the car seat in either of the two positions it usually occupies while a train is traveling from or toward a station.

Another advantage of this arrangement is that the conductor can fasten the backs of all the seats in one position and carry the pin with him and when necessary unfasten any of the bolts and turn the backs of the seats, while the passengers are prevented from doing so. This is desirable in order to prevent a passenger from placing his feet on the cushion of the seat opposite to him and otherwise monopolizing more than his allotted space.

To enable others, skilled in the art, to make and use my invention, I will proceed to describe its construction and operation.

The back $m$, of the car seat is hung upon center pins $l$, by means of arms $k$, in the usual manner. A shoulder-plate $a$, is fastened to each corner of each side of a seat, as seen in Fig. 1. The shoulder plate is provided with a shoulder $e$, for the arm $k$, of the back of the seat to rest in. Above that shoulder, there is a hole in the shoulder plate for the insertion of the bolt $c$, $d$, hereafter to me described, so that the arm $k$, will be confined between the shoulder $e$, and said bolt $c$, $d$. The hole goes through a socket $b$, extending from the inner side of the shoulder plate and fitted into a mortise in the side of the seat, as seen in Fig. 2. This mortise is deeper than the length of the socket in order to afford room for the insertion of the bolt. The bolt is round, and the part $c$, of the bolt which is intended to be outside of the shoulder plate, is of somewhat a larger diameter so as to form a shoulder $y$, $y$, which rests against the outer surface of the shoulder plate after the bolt has been inserted. The diameter of the portion $d$, of the bolt is equal to the diameter of the hole through the shoulder plate and socket $b$. A spring $p$, $h$, $i$, is fastened to the end of the bolt at $p$, and the other end of a spring extends through a slot $j$, in the side of the bolt into the hollow space inside of the bolt. The part $h$, of the spring projects beyond the surface of the bolt, and the end $i$, of the spring is flat and at some distance from the bottom of the hollow space inside of the bolt. It will be seen that the part $h$, of the spring is pressed back into the slot $j$, while the bolt is being inserted and as long as the part $h$, of the spring is within the socket $b$. But as soon as it has passed the inner edge of the socket, the spring recedes from the slot $j$, and the part $h$, of the spring bears against the rim $z$, of the socket, thus locking the bolt.

For the purpose of unfastening and withdrawing the bolt, the conductor is furnished with a pin $g$, provided with a knob $f$. On introducing this pin through the central hole which extends through the head $c$, of each of the bolts, and pressing it inward, the end of the pin will act against the part $i$, of the spring so as to force the spring back into slot $j$, (as represented by red lines in Fig. 3), when the bolt can be withdrawn.

It will be seen that this device is very simple and much cheaper than stationary locks, because of the latter there must be one to each shoulder plate, while my bolt can be removed from one shoulder plate to another. The bolt is not liable to get out of order, and even if it should, the bolt can be mended without the necessity of removing the shoulder plate which is the case with stationary locks.

What I claim as my invention, and desire to secure by Letters Patent, is—

A portable self fastening bolt, constructed as described, in combination with a detachable pin, as, and for the purposes, set forth.

C. A. McEVOY.

Witnesses:
E. PAYSON REEVE,
THOS. A. HOWARD.